(12) United States Patent
Arrowood et al.

(10) Patent No.: US 8,719,022 B2
(45) Date of Patent: May 6, 2014

(54) COMPRESSED PHONETIC REPRESENTATION

(75) Inventors: Jon A. Arrowood, Smyrna, GA (US);
Robert W. Morris, Atlanta, GA (US);
Peter S. Cardillo, Atlanta, GA (US);
Marsal Gavalda, Sandy Springs, GA (US)

(73) Assignee: Nexidia Inc., Atlanta, GA (US)

( * ) Notice: Subject to any disclaimer, the term of this patent is extended or adjusted under 35 U.S.C. 154(b) by 444 days.

(21) Appl. No.: 13/097,830

(22) Filed: Apr. 29, 2011

(65) Prior Publication Data
US 2012/0278079 A1 Nov. 1, 2012

(51) Int. Cl.
*G10L 15/00* (2013.01)

(52) U.S. Cl.
USPC .................. 704/251; 704/255; 769/769

(58) Field of Classification Search
USPC ................... 704/251, 255; 769/769
See application file for complete search history.

(56) References Cited

U.S. PATENT DOCUMENTS

| 6,185,527 | B1 * | 2/2001 | Petkovic et al. | 704/231 |
| 7,039,585 | B2 * | 5/2006 | Wilmot et al. | 704/235 |
| 8,209,171 | B2 * | 6/2012 | Abbott et al. | 704/235 |
| 2006/0206324 | A1 * | 9/2006 | Skilling et al. | 704/231 |

* cited by examiner

*Primary Examiner* — Daniel D Abebe
(74) *Attorney, Agent, or Firm* — Occhiuti & Rohlicek LLP

(57) ABSTRACT

An audio processing system makes use of a number of levels of compression or data reduction, thereby providing reduced storage requirements while maintaining a high accuracy of keyword detection in the original audio input.

23 Claims, 6 Drawing Sheets

COMPRESSED PHONETIC REPRESENTATION

BACKGROUND

This invention relates to use of compressed phonetic representation of audio input, for instance, in keyword based retrieval application.

One approach to keyword based retrieval of audio data makes use of a phonetic analysis stage, which is largely independent of the keywords that may be later desired to be located in the audio data. The phonetic representation is searched to determine locations of keywords of interest. One approach to forming such a phonetic representation is described in U.S. Pat. 7,263,484, titled "Phonetic Searching," which is incorporated herein by reference.

SUMMARY

In one aspect, in general, an audio processing system makes use of a number of levels of compression or data reduction, thereby providing reduced storage requirements while maintaining a high accuracy of keyword detection in the original audio input.

In another aspect, in general, a method for searching acoustic information includes processing at an input section an acoustic input over a time interval. The processing at the input section includes forming a variable rate compressed representation of a degree of presence of a set of subword units as a function of a time in the interval. The compressed representation is then passed to a search section. The compressed representation is processed at the search section to form a search output representing a presence of a query in the acoustic input.

Aspects can include one or more of the following features.

The subword units comprise phonetic units.

Processing the acoustic input further includes forming a fixed length representation of the degree of presence of the set of subword units for each of a sequence of times.

Processing the acoustic input further includes forming a variable compression of the fixed length representation at times in the sequence of times to form the variable rate compressed representation.

Processing the acoustic input further includes for each of the sequence of times identifying a set of likely subword units, and encoding information associated with the set separately from information associated with the remaining subword units in the compressed representation.

Processing the acoustic input further includes forming a vector quantization of the degree of presence of the set of subword units.

Processing the acoustic input further includes determining an indicator of interest in regions of the acoustic input, and forming the variable rate representation includes applying a different degree of compression according to the indicator of interest.

The indicator of interest comprises a binary indicator, and applying the different degree of compression comprises omitting regions of non interest from the compressed representation.

Processing the acoustic input further includes forming a compression map that encodes an association of time in the time interval of the input and locations in the variable rate compression.

Processing the acoustic input further includes performing an initial search for additional units defined in terms of the subword units, and wherein the compressed representation encodes a degree of presence of a set of the additional units as a function of a time.

The additional units comprise context-dependent phoneme units.

Processing compressed representation at the search section includes determining a degree of presence of a set of additional units as a function of time.

The additional units comprise context-dependent phoneme units.

The additional units depend on the query.

Determining the degree of presence of the additional units comprises accessing a statistically trained model that relates the degree of presence of the set of subword units to degree of presence of each of a set of context-dependent subword units.

Passing the compressed representation to the search section includes storing the compressed representation in a storage device.

Passing the compressed representation to the search section includes passing the compressed representation over a communication link between the input section and the search section.

Processing the compressed representation at the search section includes decompressing the variable rate compressed representation, and searching for the presence of the query using the decompressed representation.

Processing the compressed representation at the search section further includes accessing a compression map that encodes an association of time in the time interval of the input locations in the variable rate compression to select portions of the compressed representation for processing.

Processing the compressed representation at the search section further includes accessing a compression map that encodes an association of time in the time interval of the input locations in the variable rate compression to determine times in the time interval of the input associated with detected locations of the query.

Processing the compressed representation at the search section includes determining a degree of presence of a set of the additional units defined in terms of the subword units based on a decompression of the compressed representation, and using the determined degrees in forming the search output.

In another aspect, in general, an audio search system includes an input section for processing an acoustic input over a time interval. The processing by the input section includes forming a variable rate compressed representation of a degree of presence of a set of subword units as a function of a time in the interval. A search section is used for processing the compressed representation to form a search output representing a presence of a query in the acoustic input. A data transfer section is used for passing the compressed representation from the input section to the search section.

Aspects can include one or more of the following features.

The input section includes a phonetic analysis module for processing an acoustic input and forming a fixed length representation of the degree of presence of the set of subword units for each of a sequence of times.

The input section includes a variable rate compression module for forming the variable rate compressed representation from the fixed-length representation.

The search section includes a decompression module for reconstructing a fixed-length representation of the degree of presence of the set of subword units for each of a sequence of times.

The search section includes a search module for processing the fixed-length representation and a query to determine data representing presence of the query in the acoustic input.

Advantages of one or more aspects can include the following.

Compression of the signal representation can reduce storage or communication requirements.

Compression of the signal representation can provide additional information, thereby improving search accuracy, within the same amount of storage or communication capacity.

Other features and advantages of the invention are apparent from the following description, and from the claims.

DESCRIPTION

Figure 1A:
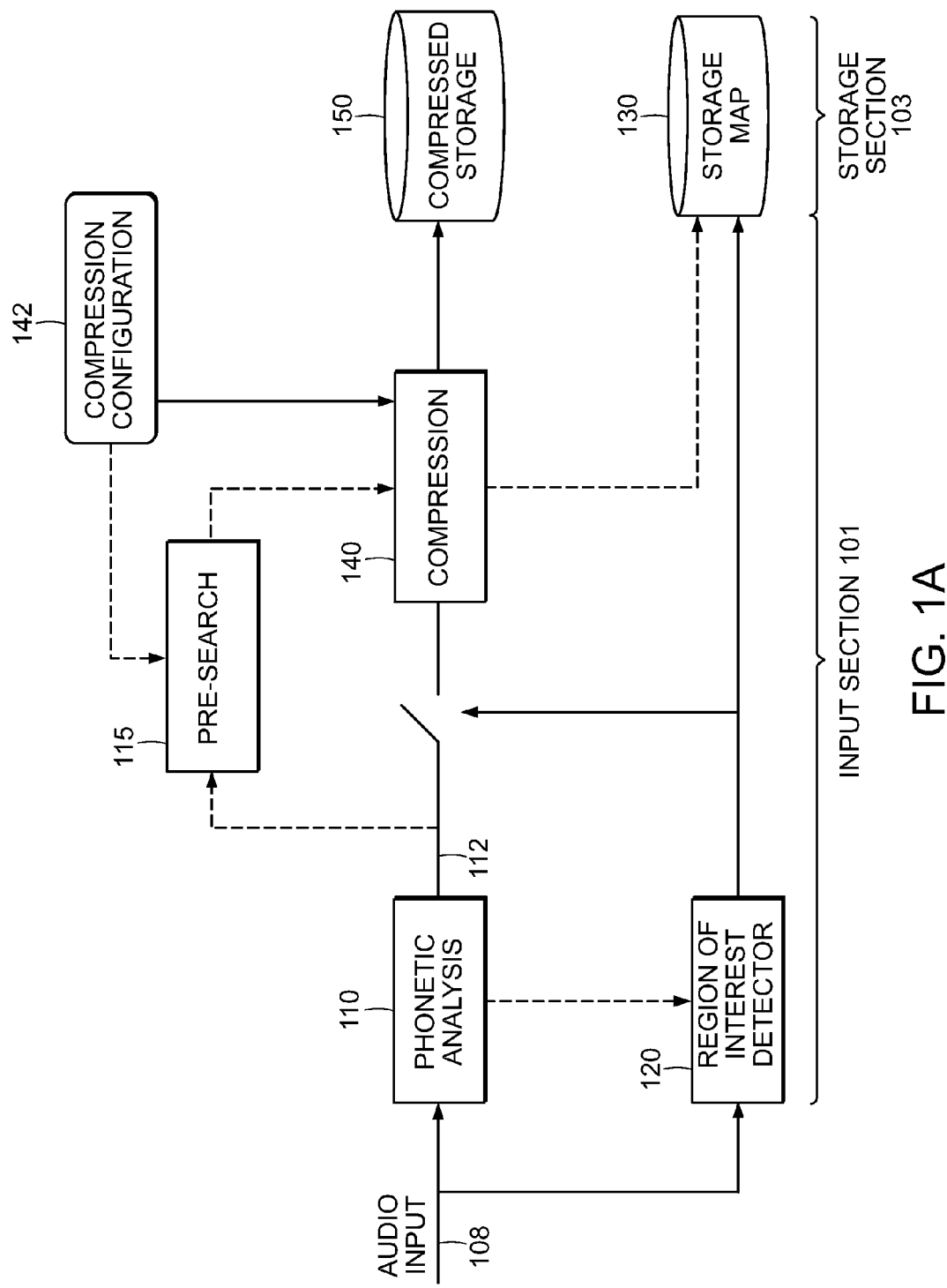
FIGS. 1A-1B are a block diagram of an audio processing system.
Figure 1B:
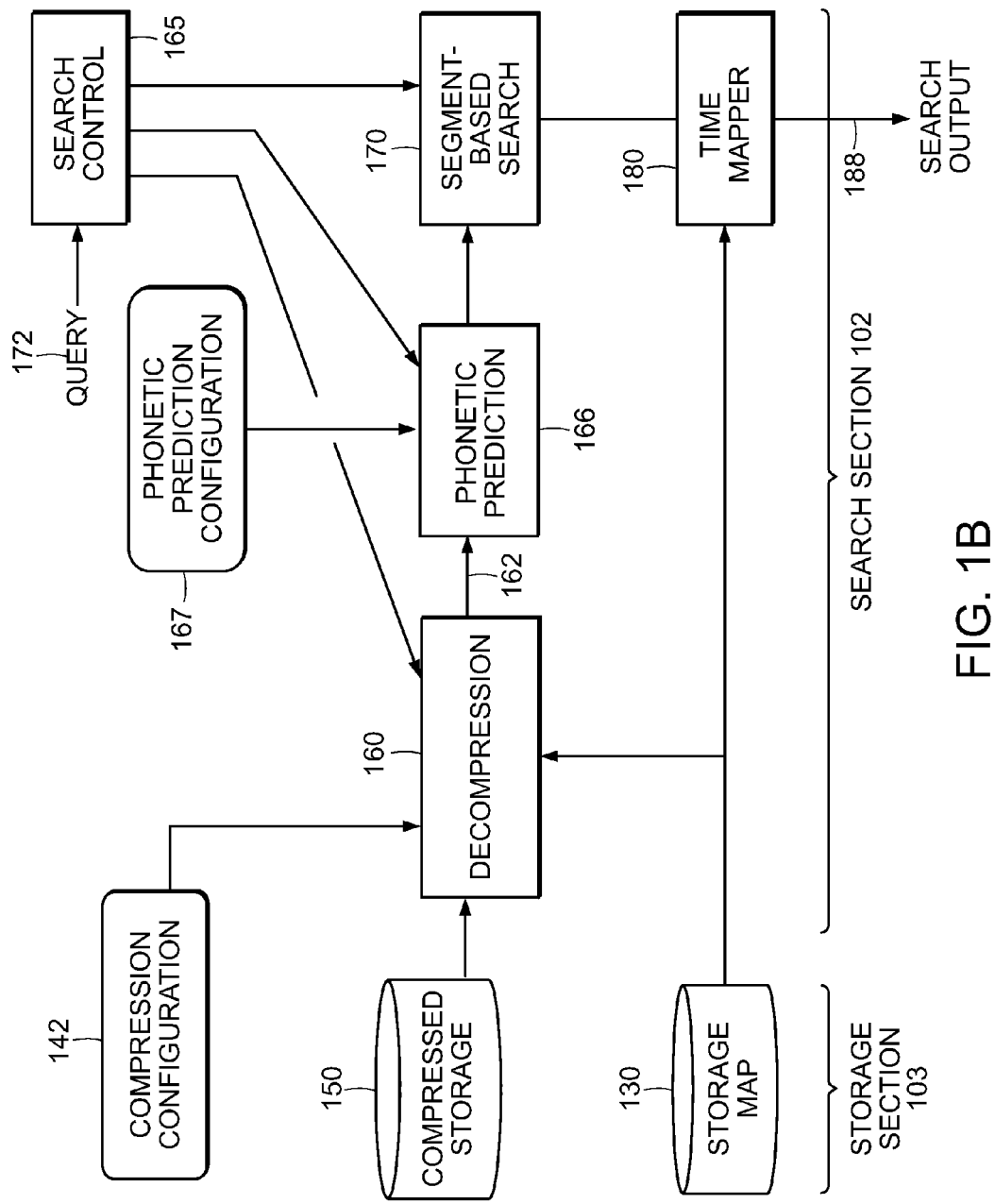

Referring to FIGS. 1A-B, an audio processing system accepts an audio input 108, which generally contains speech spoken by one or more talkers. For example, the audio input may represent one or both sides of a telephone conversation between a customer and a call center representative. Some time after the audio input is received a query 172 is processed by the system to produce search output 188, which represents detection information for the query. Generally, this detection information represents whether the query is present in the input audio, a degree of certainty that it is present, and/or locations (e.g., time intervals) at which the query occurred in the input. It should be understood that a simple query may consist of a single keyword that is being sought (e.g., the word "rabbit"), but that more generally, the query can be more complex comprising connectors for terms in the query, where the connectors may for be, for instance Boolean and/or temporal (e.g., maximum or minimum separation).

Generally, the system 100 includes an input section 101 and a search section 102. A storage section 103 holds output from the input section, which is then provided, typically at a later time, to the search section 102. In general, data stored in the storage section 103 for a particular input 108 may be used repeatedly after having been processed once in the input section 101. In some examples, the data in the storage section 103 is stored on a magnetic disk or solid state storage in the section. In some examples, the storage section 103 is replaced with a transmission system, for example, that transfers the information over a data communication link, thereby allowing the search section 102 to process the audio input on an ongoing basis with a somewhat variable delay.

The processing in the input section 101 reduces the amount of processing needed in the search section 102, which can result in faster response from the time that a query is accepted to the time that query results are output. However, there is a storage cost associated with such input processing. A number of embodiments are described below in which compression approaches are incorporated into the input section 101.

Some of the compression approaches are such that the amount of storage for unit time of input is not necessarily constant (i.e., there is a variable compress rate) and not all sections of the input 108 are necessarily represented in the storage. For example, the storage section includes a compressed storage 150, which includes data representing the acoustic content of the input signal over time, as well as a storage map 130, which provides a way to access the compressed data for selected portions of the original input signal, indexed by a time in an original time reference of the input signal (e.g., 60 seconds from the beginning of the input signal). For example, the storage map 130 provides the information needed to map from a time offset (e.g., in seconds) to a data offset in the compressed storage (e.g., in bytes).

The search section 102 makes use of the compressed storage 150 in executing phonetically or other acoustically based queries to local instances of the queries in the input audio. The output of the search section represents the locations of the instances in a time reference of the original input signal and is essentially insensitive to the compression performed by the input section 101.

The input section 101 processes the input signal in a phonetic analysis module 110. For example, this module first performs a signal processing of a digital representation of the audio signal, for example, to form representations of the local spectral characteristics (e.g., a Cepstral representation) of the input at regular intervals, for example, every 15 ms, which is referred to as the frame rate of the analysis. The phonetic analysis section 110 processes the successive frames to form successive estimates of the phonetic label that should be applied at each frame, for example, using a Hidden Markov Model (HMM) technique as described in "Phonetic Searching," U.S. Pat. No. 7,263,484. Generally, the output of the phonetic analysis is data indexed by time, PAT(t), where t is an integer index of frames.

In some examples, the phonetic analysis module 110 produces a fixed amount of data, PAT(t), for each frame of input at time t. An example of such a fixed representation is a vector with one element associated with each of the phoneme labels in the language being processed, and the element holding a number related to whether the associated phoneme label is appropriate for that frame. In some examples, the number is a probability or a logarithm of a probability of the phoneme being present at that frame based on trained HMM models. For example, PAT(t) can represent a probability distribution $p(i)$, where i is an index of a phoneme label, for example for some choices of phonetic alphabet ranging from 1 to 40. This representation of input signal 108 can represent a lossy compression or transformation of the input in the sense that the original audio signal cannot be reconstructed from the output of the analysis.

Figure 2:
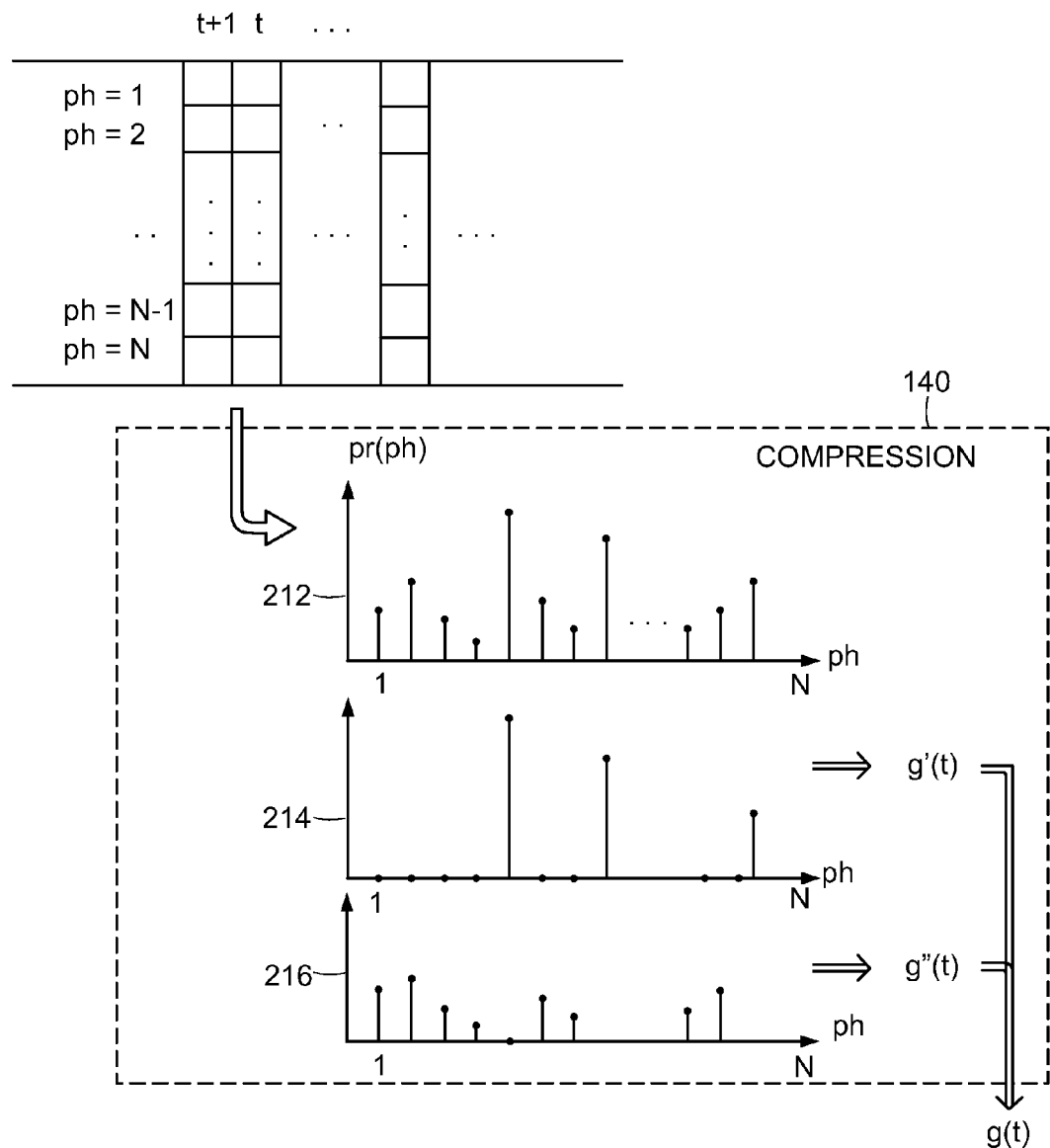
FIG. 2 is a diagram illustrating a compression approach.

Referring to FIG. 2, the output of the phonetic analysis 110 is passed to a compression module 140. Generally, in various embodiments, the compression module performs a fixed rate or a variable rate compression of the output of the analysis module 110, and in different examples may be lossy or lossless.

An example of a lossless compression that may be used in the compression module is a data compression, for example, using a LZW compression algorithm. An example of a lossy compression of the data is a vector quantization (VQ) of the vectors of phoneme probabilities. In some examples, the compression is memoryless, with each frame being independently compressed. More generally, a compression technique that processes sequences of frames provides higher compression rates. The output of the compression module 140 is passed to the compressed storage.

One example of a VQ based compression considers the phoneme probability distribution $p(i)$ as a vector (e.g., a 40-dimension real-valued vector), and at least conceptually uses a partition for the vector space such that the output of each compression step is the index of the part in which the distribution fell. In later decompression, each index is replaced with a prototype from each part of the space. In some examples, the VQ is performed by selecting the index of the prototype that is closest to the input distribution. In other examples, different VQ approaches are used, for example, in which the probability distributions for multiple times are combined and quantized together, or in which one probability distribution is split and the resulting pieces are quantized separates (i.e., in product encoding). For distance based quantization, different distance metrics can be used, for example, weighting different phoneme labels differently, and using different distance calculations on each dimension (e.g., difference between probabilities, differences between log probabilities, etc.). The quantization approaches are not necessarily nearest neighbor based; for example, tree-based quantization may be used. The process of design of the prototypes may use a number of conventional techniques, and may be based on minimizing a quantization error, or in some examples, may be based on criteria related to minimization of search error.

In some examples, it may be useful to preserve the phoneme probabilities for high probability phonemes relatively accurately as compared to the probabilities of relatively low probability phonemes. In example in which log probabilities are used in the VQ step, a distance between a log prototype probability (i.e., along one dimension) and a log input probability corresponds to a ratio of the prototype and input probabilities. However, such a metric may not penalize errors in the high scoring phonemes sufficiently for high search accuracy.

Referring to FIG. 2, one approach to encoding a phoneme distribution of a PAT file is to first consider the probability distribution 212, and identify a number (e.g., a fix number, a number that exceed a fixed threshold) of phonemes for separate encoding. The probability distribution is then represented as a combination of a sparse distribution 214 with non-zero values at the identified phones, and a remaining "background" distribution 216.

In some examples, the high-probability values are encoded as a data value $q'(t)$, for example, explicitly encoding three index values, or some variable length encoding (e.g., Huffman encoding) and three probability values, or scalar or vector quantized versions of those values (e.g., using a quantization codebook that depends on the indices). The encoded high probability values are then removed from the distribution (e.g., by subtraction or division/subtraction in the log domain) to form the background distribution 216. The background distribution is then vector quantized to from encoded data $q''(t)$, for example, using a codebook of prototypes that is used for all frames, or a particular codebook that depends on the indices of the high-scoring probabilities. The compressed output for frame t is then made up of both $q'(t)$ and $q''(t)$. Note any of the quantities may be losslessly compressed in a variable rate manner according to entropy coding principles (e.g., Huffman coding).

Figure 4:
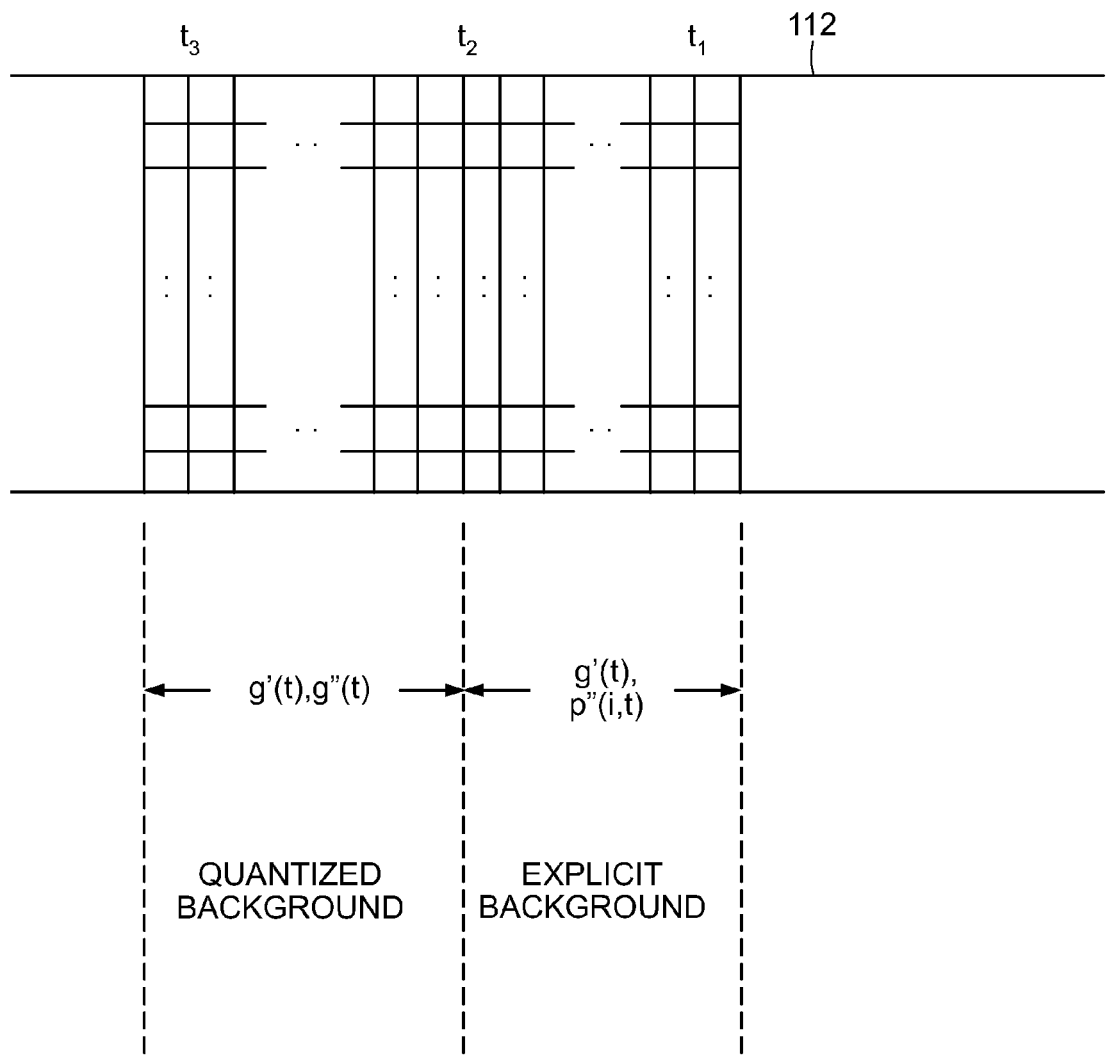
FIG. 4 is a diagram illustrating a region-dependent compression approach.
Figure 5:
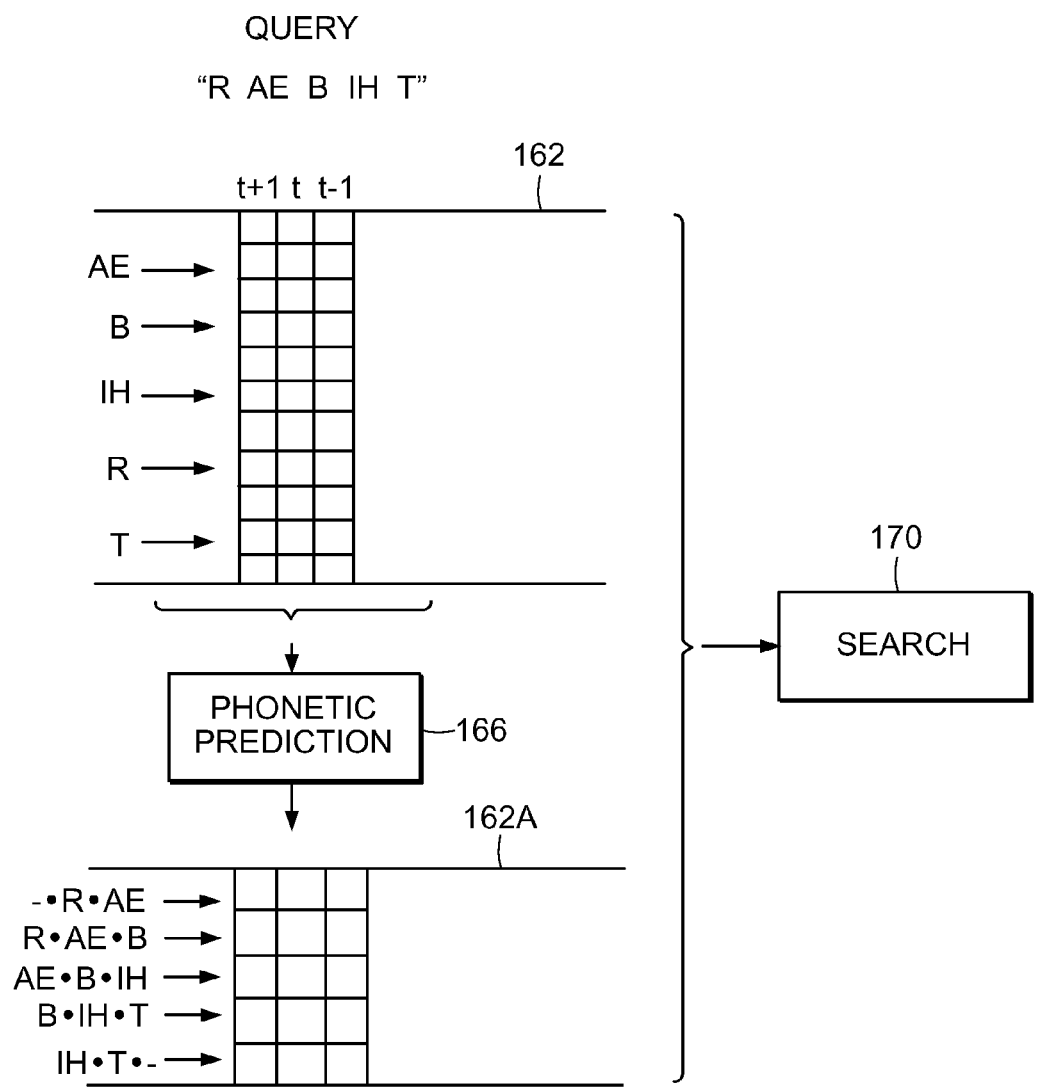
FIG. 5 is a diagram illustrating a phonetic prediction approach.

Referring to FIG. 4, in some examples, different sections of the input may be compressed using different approaches, for example based on the residual error. In one such example, the high-probability phonemes are encoded as above, but the background distribution is either vector quantized or explicitly represented based on a measured quantization error.

In some examples, multiple frames are quantized with this type of approach, for example, relying on indices and/or probabilities of the high-scoring phonemes remaining relatively constant over the server frame time scale. In some examples, a time-based filtering of the probabilities is performed (e.g., time filtering the log probabilities) as a further basis for reducing the size of the compressed file.

Another approach to compression, which may be used independently or in combination with the approaches described above, makes use of a regions-of-interest (ROI) detector 120. Alternatively, or in addition to the audio input, the ROI detector may use the output of the phonetic analysis module. Generally, the output of the ROI detector is an indication of which time regions of the input are of interest. As one example, the ROI detector forms disjoint time segments in which speech is detected using a speech activity detector. In other examples, segments are formed based on a speaker identity, speaker change detection, or other criteria. The output of the ROI detector is stored in a storage map 130, which includes a database with a table with one record per segment recording the start time of the segment in the time reference of the original input signal.

The output of the ROI detector 120 is also used to gate the output of the phonetic analysis 110 so that a series of distinct time segments are passed to the compression module 140. In examples in which the compression module does not perform a memoryless compression of each frame, the compression process is restarted so that a compressed segment can be decompressed without requiring compressed data from other segments. The compression module 140 passes starting locations of each compressed segment to the storage map 130 so that each segment is both associated with a start time (and optionally duration) in the original time frame, and a start location (and optionally size) in the compressed storage 150.

Figure 3:
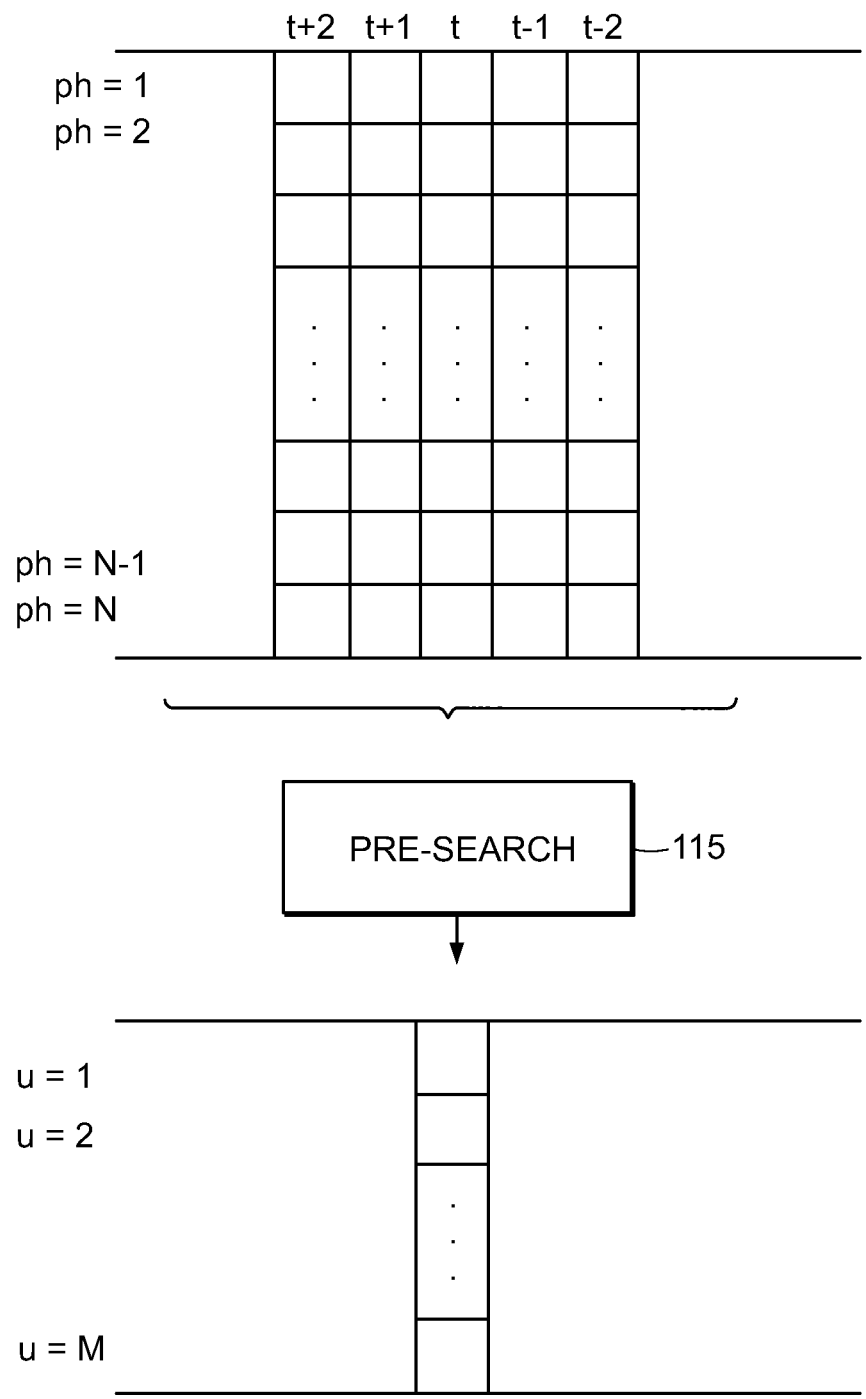
FIG. 3 is a diagram illustrating a pre-searching approach.

Referring to FIG. 3, as an optional processing prior to compression, an initial search (pre-search) module 115 may process the output of the phonetic analysis. For example, the initial search may perform a search for three-phoneme sequences (u=1, ..., M in FIG. 3) in each of the segments identified by the ROI detector 120. The product of the initial search is then stored in the compressed storage along with the compressed phonetic analysis. In some example, when searching a compressed segment, the result of the initial search may be independently decompressed to determine whether a full search of the segment is warranted. For example, only segments in which all the three-phoneme sequences of the query were detected in that segment in the initial search (e.g., with high enough scores and/or in an appropriate sequence), and only such segments are decompressed because a full search of the segment is warranted and will be performed.

In some alternative embodiments, the ROI detector outputs a soft decision in which a degree of interest is determined. For example, some parts of the input may be declared as possibly of interest on a numerical scale. For example, a probability of speech may be computed. In some such examples, this degree of interest is passed to the compression module which performs a more aggressive lossy compression of regions that are less interesting, thereby retaining more information for the higher interest sections.

In some alternative embodiments, the segments are not necessarily formed at times when the ROI detector declares that there is no interest at that time. For example, segments may be formed periodically to limit the overall size of a segment. In some example is which such segment boundaries are inserted, there may be overlap between compressed segments so that queries at a boundary are not missed in the search.

Note that other forms of phonetic analysis may be performed. For example, a phonetic lattice or graph may be produced. The compression of such a lattice may correspond to pruning of the lattice.

Turning back to FIG. 1B, the search section 102 of the system accesses the compressed storage 150 and corresponding storage map 130 to process a query 172 received from a user. For example, a user may specify a query to be located anywhere in the storage data. In response to such a query, a decompression module 160 decompresses each segment of phonetic data and passes that decompressed data to a segment based search module 170. It is assumed that instances of the query do not cross segment boundaries. The output of the search is putative locations of the query, with locations identified by segment and time offset from the start of that segment.

In order to provide the putative results in the original time reference, a time remapper uses the storage map to combine the within-segment time offset and the start time of the segment in the original time frame to output time indexed putative results in the original time reference.

In some examples, the query 172 specifies an original time range in which to search, in which case the storage map 130 is used to select the corresponding data section in the compressed storage 150 for decompression and searching.

In some examples, an optional phonetic prediction module 166 is used to augment the decompressed phonetic data before searching. One example of such prediction takes the phonetic elements of the query and expands the phonemes of the PAT file to include context-dependent phoneme probabilities. In an instance in which the query is the word "rabbit", which may be represented as a sequence of phonemes "R AE B IH T", probabilities for context-dependent probabilities, such as AE-B-IH (B in the context of AE preceding and IH following), are derived. In some examples, a support vector machine (SVM) is trained in advance, and takes several frames of decompressed PAT file 162 to estimate a query specific augmentation 162A of the PAT file, which is used by the search module 170. In some examples, the SVM (or other predictor) is separately trained based on the indices of the high scoring phonemes, which can result in up to 40×40×40 different SVMs if there is sufficient training.

Note that each of the approaches described above can be used alone, or in combination with other subsets of the combinations, and therefore it is not essential that each embodiment of the overall system implement all the approaches.

The approach described above may be implemented in software, for example, using a general purpose computer processor, with the software including instructions for the computer processor being stored on a machine-readable medium, such as a magnetic or optical disk. In some examples, the approach is implemented in a distributed fashion where the input section 101 may be implemented on a different computer or at a different location that the search section 102. The compressed storage 150 and storage map 130 may be implemented as databases, but other forms of data storage can be used, making use of non-volatile or volatile (transient) storage depending on the application and needed data flow.

It is to be understood that the foregoing description is intended to illustrate and not to limit the scope of the invention, which is defined by the scope of the appended claims. Other embodiments are within the scope of the following claims.

What is claimed is:

1. A method for searching acoustic information comprising:
    processing at an input section an acoustic input over a time interval, including forming a variable rate compressed representation of a degree of presence of a set of subword units as a function of a time in the interval;
    passing the compressed representation to a search section; and
    processing the compressed representation at the search section to form a search output representing a presence of a query in the acoustic input,
    wherein processing the acoustic input further includes forming a fixed length representation of the degree of presence of the set of subword units for each of a sequence of times.

2. The method of claim 1 wherein the subword units comprise phonetic units.

3. The method of claim 1 wherein processing the acoustic input further includes forming a variable compression of the fixed length representation at times in the sequence of times to form the variable rate compressed representation.

4. The method of claim 1 wherein processing the acoustic input further includes for each of the sequence of times identifying a set of likely subword units, and encoding information associated with the set separately from information associated with the remaining subword units in the compressed representation.

5. The method of claim 1 wherein processing the acoustic input further includes forming a vector quantization of the degree of presence of the set of subword units.

6. The method of claim 1 wherein processing the acoustic input further includes determining an indicator of interest in regions of the acoustic input, and forming the variable rate representation includes applying a different degree of compression according to the indicator of interest.

7. The method of claim 6 wherein the indicator of interest comprises a binary indicator, and applying the different degree of compression comprises omitting regions of non interest from the compressed representation.

8. The method of claim 1 wherein processing the acoustic input further includes forming a compression map that encodes an association of time in the time interval of the input and locations in the variable rate compression.

9. The method of claim 1 wherein processing the acoustic input further includes performing an initial search for additional units defined in terms of the subword units, and wherein the compressed representation encodes a degree of presence of a set of the additional units as a function of a time.

10. The method of claim 9 wherein the additional units comprise context-dependent phoneme units.

11. The method of claim 1 wherein processing compressed representation at the search section includes determining a degree of presence of a set of additional units as a function of time.

12. The method of claim 11 wherein the additional units comprise context-dependent phoneme units.

13. The method of claim 12 wherein the additional units depend on the query.

14. The method of claim 11 wherein determining the degree of presence of the additional units comprises accessing a statistically trained model that relates the degree of presence of the set of subword units to degree of presence of each of a set of context-dependent subword units.

15. The method of claim 1 wherein passing the compressed representation to the search section includes storing the compressed representation in a storage device.

16. The method of claim 1 wherein passing the compressed representation to the search section includes passing the compressed representation over a communication link between the input section and the search section.

17. The method of claim 1 wherein processing the compressed representation at the search section includes decompressing the variable rate compressed representation, and searching for the presence of the query using the decompressed representation.

18. The method of claim 17 wherein processing the compressed representation at the search section further includes accessing a compression map that encodes an association of time in the time interval of the input locations in the variable rate compression to select portions of the compressed representation for processing.

19. The method of claim 17 wherein processing the compressed representation at the search section further includes accessing a compression map that encodes an association of time in the time interval of the input locations in the variable rate compression to determine times in the time interval of the input associated with detected locations of the query.

20. The method of claim 1 wherein processing the compressed representation at the search section includes determining a degree of presence of a set of the additional units defined in terms of the subword units based on a decompression of the compressed representation, and using the determined degrees in forming the search output.

21. An audio search system comprising:
- an input section for processing an acoustic input over a time interval, including forming a variable rate compressed representation of a degree of presence of a set of subword units as a function of a time in the interval, the input section including a phonetic analysis module for processing an acoustic input and forming a fixed length representation of the degree of presence of the set of subword units for each of a sequence of times;
- a search section for processing the compressed representation to form a search output representing a presence of a query in the acoustic input; and
- a data transfer section for passing the compressed representation from the input section to the search section.

22. The audio search system of claim 21 wherein the input section comprises:
- a variable rate compression module for forming the variable rate compressed representation from the fixed-length representation.

23. The audio search system of claim 21 wherein the search section comprises:
- a decompression module for reconstructing a fixed-length representation of the degree of presence of the set of subword units for each of a sequence of times; and
- a search module for processing the fixed-length representation and a query to determine data representing presence of the query in the acoustic input.

* * * * *